(12) United States Patent
Jollec

(10) Patent No.: US 8,356,383 B2
(45) Date of Patent: Jan. 22, 2013

(54) WINDSCREEN WIPER DEVICE

(75) Inventor: Ludovic Jollec, Saint Laurent sur Othain (FR)

(73) Assignee: Federal-Mogul S.A., Aubange (BE)

( * ) Notice: Subject to any disclaimer, the term of this patent is extended or adjusted under 35 U.S.C. 154(b) by 1156 days.

(21) Appl. No.: 11/996,225

(22) PCT Filed: Jul. 6, 2006

(86) PCT No.: PCT/EP2006/063943
§ 371 (c)(1),
(2), (4) Date: Jul. 22, 2008

(87) PCT Pub. No.: WO2007/009886
PCT Pub. Date: Jan. 25, 2007

(65) Prior Publication Data
US 2010/0275403 A1    Nov. 4, 2010

(30) Foreign Application Priority Data

Jul. 19, 2005 (EP) .................................. 05106616

(51) Int. Cl.
*B60S 1/38* (2006.01)
*B60S 1/40* (2006.01)

(52) U.S. Cl. ............. 15/250.43; 15/250.32; 15/250.201; 29/428; 29/DIG. 48

(58) Field of Classification Search ............... 15/250.32, 15/250.43, 250.44, 250.361, 250.31, 250.451; 29/428, DIG. 48
See application file for complete search history.

(56) References Cited

U.S. PATENT DOCUMENTS

| 7,523,522 B2 * | 4/2009 | Herring et al. ............. 15/250.32 |
| 2001/0004783 A1 * | 6/2001 | Kotlarski .................... 15/250.32 |
| 2004/0025281 A1 * | 2/2004 | Baseotto et al. ........... 15/250.32 |
| 2005/0177970 A1 * | 8/2005 | Scholl et al. ................ 15/250.32 |
| 2006/0021177 A1 * | 2/2006 | Marmoy et al. ............ 15/250.32 |
| 2006/0282972 A1 * | 12/2006 | Huang ...................... 15/250.201 |

FOREIGN PATENT DOCUMENTS

| DE | 10025629 | * | 11/2001 |
| DE | 10034790 | * | 2/2002 |
| DE | 100 38 992 A1 | | 3/2002 |
| DE | 10038993 | * | 3/2002 |
| DE | 100 58 208 A1 | | 7/2002 |
| DE | 101 14 476 A1 | | 9/2002 |
| EP | 1 359 073 A | | 11/2003 |

* cited by examiner

*Primary Examiner* — Gary Graham
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of longitudinal strips are interconnected by a respective connecting piece, which windscreen wiper device comprises a connecting device for an oscillating wiper arm, wherein oscillating arm is pivotally connected to connecting device about a pivot axis near one end, with the special feature that connecting device is soldered to longitudinal strips.

7 Claims, 3 Drawing Sheets

WINDSCREEN WIPER DEVICE

TECHNICAL FIELD

The invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of the longitudinal strips are interconnected by a respective connecting piece, which windscreen wiper device comprises a connecting device for an oscillating wiper arm, wherein oscillating arm is pivotally connected to the connecting device about a pivot axis near one end.

RELATED ART

Such a windscreen wiper device is generally known. The prior art windscreen wiper device is in particular designed as a "yokeless" wiper device, wherein use is no longer made of several yokes pivotally connected to each other, but wherein the wiper blade is biassed by the carrier element, as a result of which it exhibits a specific curvature. The oscillating arm of the prior art windscreen wiper device comprises a projecting pin on one side thereof, which is inserted sideways into a through hole of the connecting device.

The connecting device is attached to the unit consisting of the elongate wiper blade and the longitudinal strips through a clamping operation, wherein clamping parts of connecting device are clamped round longitudinal sides of the strips. In order to lock the connecting device in a direction along the longitudinal strips, strips are each provided with a recess at their exterior longitudinal side so that the clamping parts of the connecting device rest in the recess. Obviously, cutting such a precisely shaped recess in each longitudinal strip needs additional tools and an extra step in manufacturing the windshield wiper device.

International (PCT-) patent publication no. WO 02/04269 (Valeo Auto-Electric Wischer and Motoren GmbH) described a windshield wiper device wherein the connecting device and the longitudinal strips are welded.

SUMMARY OF THE INVENTION AND ADVANTAGES

The object of the invention is to overcome the drawbacks of the prior art as indicated above, in particular to provide a windscreen wiper device wherein the connecting device and the unit consisting of the wiper blade and the strips are interconnected in a durable, solid manner, without the need of additional tools and an extra cutting step in the manufacturing process of the windshield wiper device.

In order to accomplish that objective a windscreen wiper device of the kind referred to in the introduction is characterized according to the invention in that the connecting device is soldered to the longitudinal strips. In other words, the connecting device and the longitudinal strips are connected together through a soldering operation in such a manner as to withstand shearing forces in a direction along the longitudinal strips. Such a soldering operation is also called a brazing operation. The connecting device is soldered along its entire length to the longitudinal strips or at several points along its length.

In a preferred embodiment of a windscreen wiper device in accordance with the invention the connecting device is soldered to the longitudinal strips through an ultrasonic soldering operation.

In another preferred embodiment of a windscreen wiper device according to the invention the connecting device comprises engaging members engaging around longitudinal vertical sides of the longitudinal strips that face away from each other, so that the longitudinal strips are mounted in grooves formed by the engaging members, wherein the engaging members are soldered to the longitudinal vertical sides.

In another preferred embodiment of a windscreen wiper device in accordance with the invention the connecting device comprises engaging members engaging around longitudinal vertical sides of the longitudinal strips that face away from each other, so that the longitudinal strips are mounted in grooves formed by the engaging members, wherein the engaging members are soldered to at least one longitudinal horizontal side of each longitudinal strip. Preferably, the engaging members are soldered to two longitudinal horizontal sides of each longitudinal strip that face away from each other.

In another preferred embodiment of a windscreen wiper device according to the invention the connecting device and the engaging members are made in one piece. The connecting device and the engaging members are preferably made in one piece of polymer material (whether or not enforced by glass fibers), wherein the longitudinal strips are either entirely made of polymer material as well or provided with a polymer skin. In the latter case the longitudinal strips can be made by co-extrusion of a polymer around a steel wire.

In another preferred embodiment of a windscreen wiper device in accordance with the invention a polymer material is used as a soldering material. Particularly, the polymer material comprises a polymer resin.

It is noted that in a windscreen wiper device according to the invention the connecting pieces are clamping members, which form separate constructional elements. In particular, the connecting pieces are form-locked ("positive locking" or "having positive fit") or force-locked to the adjacent ends of the longitudinal strips. Particularly, the connecting pieces are in one piece with the longitudinal strips. It is noted that at least the longitudinal strips are made of spring band material, preferably steel, coated with a polymer material.

The invention furthermore relates to a method for manufacturing a windscreen wiper device according to the invention, wherein opposing longitudinal grooves are formed in the longitudinal sides of an elongated wiper blade of a flexible material, which can be placed in abutment with a windscreen to be wiped, in which grooves longitudinal strips of a carrier element are subsequently fitted in spaced-apart relationship, wherein neighbouring ends of the longitudinal strips are interconnected by a respective connecting piece, wherein an oscillating arm is pivotally connected to a connecting device of the windscreen wiper device about a pivot axis near one end thereof, characterized in that a polymer material as a soldering material is provided between the connecting device and the longitudinal strips, wherein the connecting device is subsequently soldered to the longitudinal strips through an ultrasonic soldering operation.

THE DRAWINGS

The invention will now be explained in more detail with reference to figures illustrated in a drawing, wherein.

Figure 1:
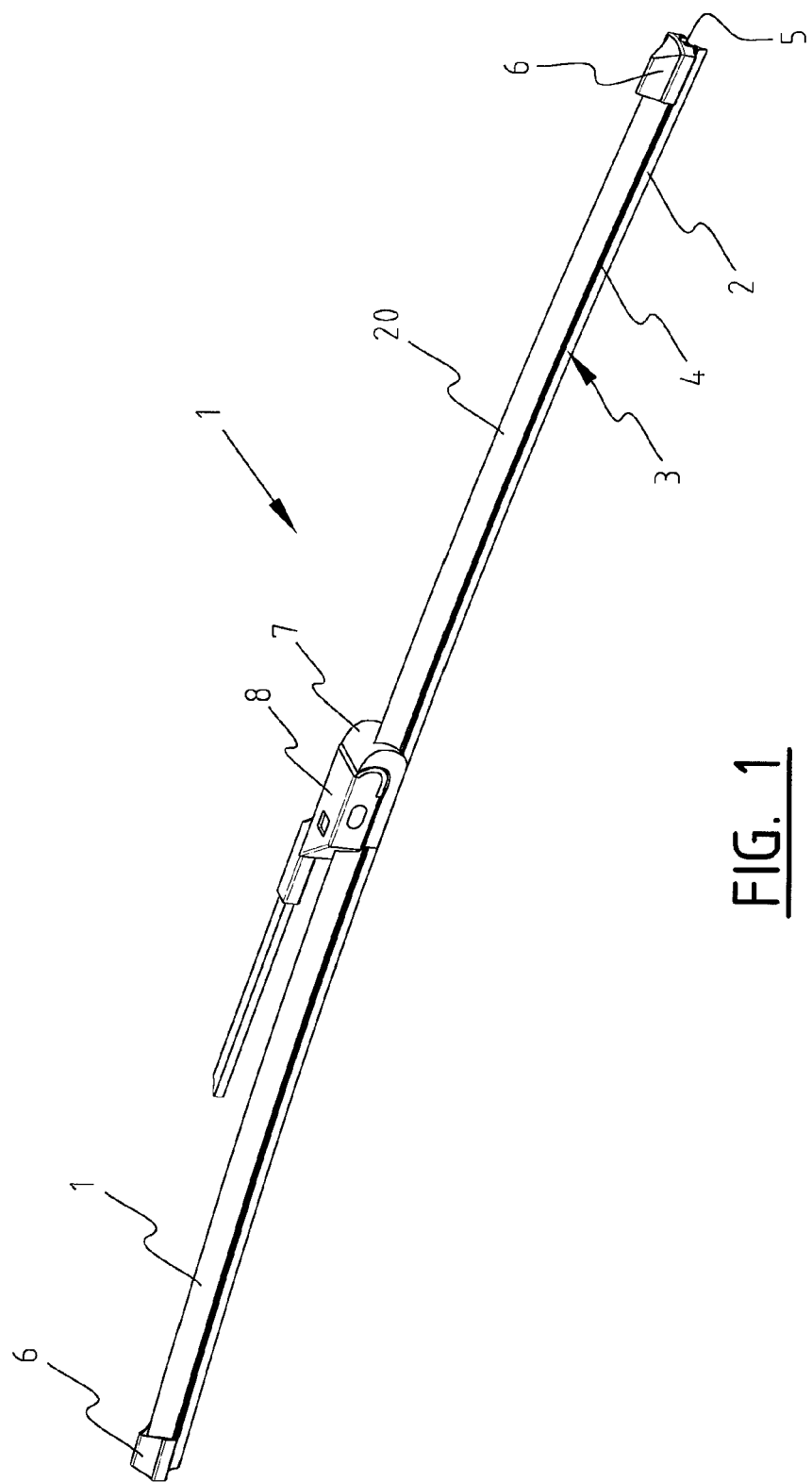
FIG. 1 is a perspective, schematic view of a preferred embodiment of a windscreen wiper device according to the invention.
Figure 2A:
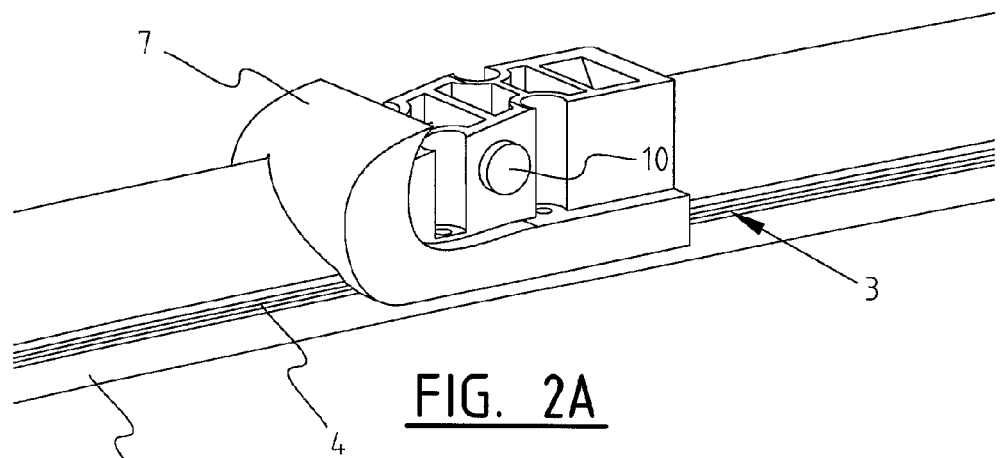
FIGS. 2a, 2b and 2c show details of the windscreen wiper device of FIG. 1.
Figure 2B:
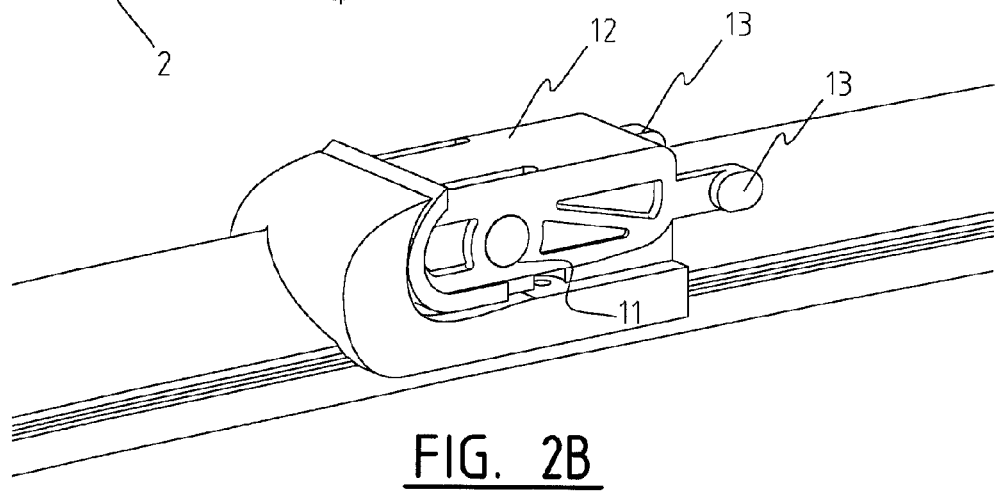
Figure 2C:
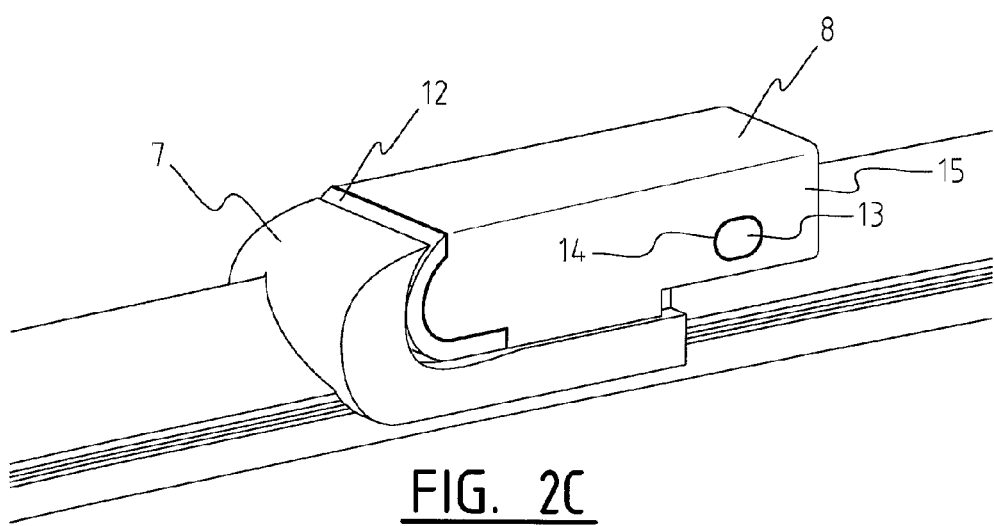
Figure 4:
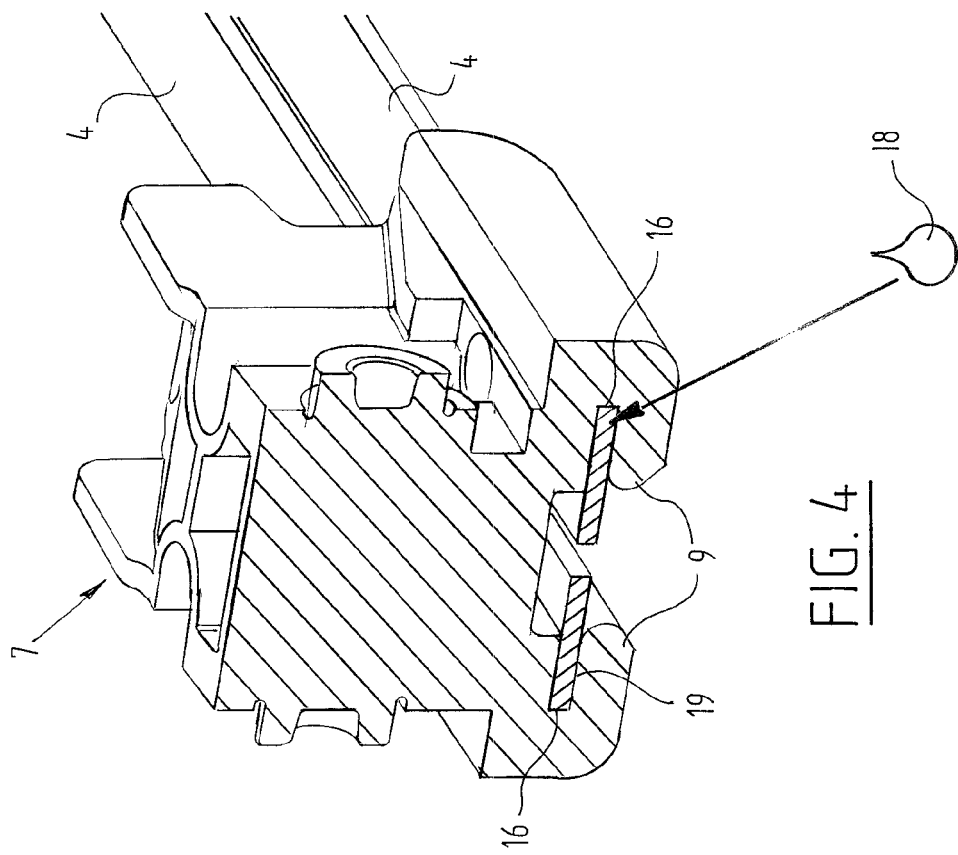
Figure 3:
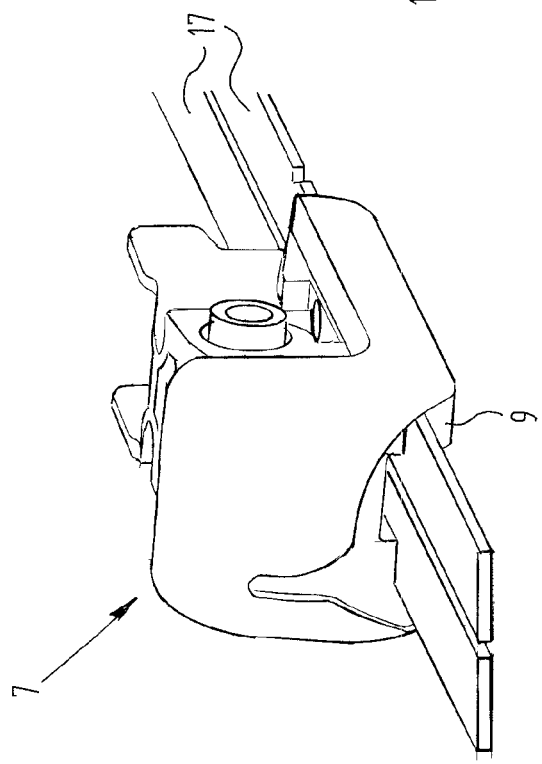

FIGS. 3 and 4 correspond to FIGS. 1 and 2, respectively, but showing in detail the manner wherein the connecting device and the longitudinal strips are connected together through a soldering technique.

DETAILED DESCRIPTION

FIGS. 1 and 2 show a preferred variant of a windscreen wiper device 1 according to the invention. The windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the rubber wiper blade 2, as it were, which is thus biased in a curved position (the curvature in operative position being that of a windscreen to be wiped). Neighbouring ends 5 of strips 4 are interconnected on either side of the windscreen wiper device 1 by means of connecting pieces 6 functioning as clamping members. In this embodiment, the connecting pieces 6 are separate constructional elements, which may be form-locked ("positive locking" or "having positive fit") as well as force-locked to the ends 5 of strips 4. In another preferred variant, the connecting pieces 6 are in one piece with the strips 4 made of spring band steel. In the latter case the connecting pieces form transverse bridges for the strips 4, as it were.

The windscreen wiper device 1 is furthermore built up of a connecting device 7 of polymer material for an oscillating wiper arm 8. Connecting device 7 comprises engaging members 9 that are integral therewith, which are polymer soldered or polymer brazed to vertical longitudinal sides 16 of the strips 4 that face away from each other and/or to opposing horizontal longitudinal sides 17 of each strip 4, as a result of which the connecting device 7 is firmly attached to the unit consisting of wiper blade 2 and strips 4 (see FIGS. 3 and 4). In this respect it is noted that the connecting device 7 is made of a polymer material and the strips 4 are made of steel with a polymer skin (coating). In the alternative the strips 4 are entirely made of a polymer material. The oscillating wiper arm 8 is pivotally connected to the connecting device 7 about a pivot axis near one end, and that in the following manner.

With reference to FIG. 2 the connecting device 7 comprises two cylindrical protrusions 10 extending outwards on either side of the connecting device 7 (FIG. 2a). These protrusions 10 pivotally engage in identically shaped cylindrical recesses 11 of a plastic joint part 12 (FIG. 2b). The protrusions 10 act as bearing surfaces at the location of a pivot axis in order to pivot the joint part 12 (and the oscillating wiper arm 8 attached thereto) about the pivot axis near one end of the arm 8. The protrusions 10 are preferably in one piece with the connecting device 7; in the alternative, the protrusions 10 are part of a single pivot pin perpendicular to the connecting device 7. The connecting device 7 may be equipped with a cover or cap in order to obtain an aesthetic appearance thereof, to avoid sharp edges and to provide protection against UV-light etcetera. The joint part 12 comprises two lateral resilient tongues 13 extending outwardly, while the oscillating arm 8 has a U-shaped cross-section at the location of its connection to the joint part 12, so that each tongue 13 engages in an identically shaped hole 14 provided in a leg 15 of the U-shaped cross-section (FIG. 2c). While mounting the oscillating wiper arm 8 onto the connecting device 7/joint part 12, the resilient tongue(s) 13 is/are initially pushed in against a spring force and then allowed to spring back into the hole(s) 14, thus snapping, that is clipping the resilient tongue(s) 13 into the hole(s) 14. This is a so-called bayonet-connection.

Before the connecting device 7 and the strips 4 are firmly connected together, a soldering material consisting of a polymer (resin) 18 is first applied on the longitudinal horizontal sides 17 of the strips 4 at the location where the connecting device 7 is to be attached thereto. After the strips 4 are then slid into grooves 19 that are formed by the engaging members 9 engaging around the longitudinal vertical sides 16 of the strips 4 that face away from each other, an ultrasonic soldering operation is finally carried out. Under the influence of heat caused by the ultrasonic soldering operation, the polymer (resin) 18 will melt and so will the polymer material of the connecting device 7 and the polymer material of the strips 4 at a location of their interconnection. Hence, a firm connecting is achieved between the connecting device 7 and the strips 4.

A spoiler 20 may be provided for (FIG. 1).

The invention is not restricted to the variants as shown in the drawing, but it also extends to other embodiments that fall within the scope of the appended claims.

The invention claimed is:

1. A windscreen wiper device comprising an elastic, elongated carrier element, as well as an elongated wiper blade of a flexible material, which can be place in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating wiper arm, wherein said oscillating arm is pivotally connected to said connecting device about a pivot axis near one end, wherein said connecting device comprises engaging members engaging around longitudinal vertical sides of said longitudinal strips that face away from each other, so that said longitudinal strips are mounted in grooves formed by said engaging members, wherein each of said longitudinal strips has at least one horizontal side with a skin of a polymer material, and wherein said engaging members are soldered to said skin of said polymer material on said at least one longitudinal horizontal side of each longitudinal strip, using a polymer material as a soldering material.

2. Windscreen wiper device according to claim 1, wherein said connecting device is soldered to said longitudinal strips through an ultrasonic soldering operation.

3. Windscreen wiper device according to claim 1, wherein said engaging members are soldered to two longitudinal horizontal sides of each longitudinal strip that face away from each other.

4. Windscreen wiper device according to claim 1, wherein said connecting device and said engaging members are made in one piece.

5. Windscreen wiper according to claim 1, wherein said polymer material comprises a polymer resin.

6. A windscreen wiper device, comprising:
an elongated wiper element having opposing longitudinal grooves;
a pair of elongated metal strips disposed in said longitudinal grooves, said strips being pre-formed into a curved shape to impart a curved shape to said wiper element and being elastically flexible to conform during use of the wiper element to the shape of a windscreen to be wiped;
said pair of elongated metal strips having at least one horizontal side with a skin of meltable polymer material applied thereto;

a connecting device for connection to an oscillating windscreen wiper arm, said connecting device being fabricated of a meltable polymer material and having engaging members in engagement with said at least one horizontal side of said metal strips; and wherein said engaging members are soldered to said skin of meltable polymer material on said at least one horizontal side of each longitudinal strip, using said polymer material as a soldering material.

7. A method of manufacturing a windscreen wiper device, comprising:

preparing an elongated wiper element having a wiping lip and a pair of opposing longitudinal grooves;

installing a pair of elongated, curved, elastic metal strips having longitudinal horizontal sides that are coated with a skin of meltable polymer material in the grooves of the wiper element to impart corresponding curvature to the wiper element;

preparing a connecting device fabricated of meltable polymer material and applying a meltable polymer solder material to at least one of the connecting device or the coated metal strips;

applying a soldering material onto at least one of the longitudinal horizontal sides of the strip;

mounting the connecting device on the coated metal strips after the soldering material is applied onto the at least one longitudinal horizontal side of the strip; and ultrasonically heating the polymers of the solder, the connecting device and the coating on the strips to melt and fuse the polymers to establish an ultrasonic solder joint between the connecting device and the strips.

* * * * *